(12) United States Patent
Upton et al.

(10) Patent No.: US 10,293,541 B2
(45) Date of Patent: May 21, 2019

(54) THERMOFORMING WITH PRECISION IN-LAY

(71) Applicant: Specialty Manufacturing Inc., San Diego, CA (US)

(72) Inventors: Jeff Upton, Carlsbad, CA (US); Haydn Forward, Ramona, CA (US); Frank Ames, Jr., San Diego, CA (US)

(73) Assignee: Specialty Manufacturing Inc., San Diego, CA (US)

( * ) Notice: Subject to any disclaimer, the term of this patent is extended or adjusted under 35 U.S.C. 154(b) by 10 days.

(21) Appl. No.: 15/438,282

(22) Filed: Feb. 21, 2017

(65) Prior Publication Data

US 2017/0157835 A1    Jun. 8, 2017

Related U.S. Application Data

(62) Division of application No. 13/418,108, filed on Mar. 12, 2012, now Pat. No. 9,610,726.

(51) Int. Cl.
| | |
|---|---|
| *B29C 51/18* | (2006.01) |
| *B29C 51/00* | (2006.01) |
| *B29C 51/34* | (2006.01) |
| *B29C 51/26* | (2006.01) |
| *B29C 51/42* | (2006.01) |
| *B29C 51/46* | (2006.01) |
| *B29C 51/10* | (2006.01) |
| *B29C 51/44* | (2006.01) |

(52) U.S. Cl.
CPC .............. *B29C 51/18* (2013.01); *B29C 51/00* (2013.01); *B29C 51/266* (2013.01); *B29C 51/34* (2013.01); *B29C 51/42* (2013.01); *B29C 51/46* (2013.01); *B29C 51/10* (2013.01); *B29C 51/44* (2013.01); *B29C 2791/006* (2013.01)

(58) Field of Classification Search
CPC ....... B29C 51/18; B29C 51/266; B29C 51/42; B29C 51/46
USPC ......................................................... 264/553
See application file for complete search history.

(56) References Cited

U.S. PATENT DOCUMENTS

| | | | |
|---|---|---|---|
| 4,052,241 A | 10/1977 | Walter | |
| 4,593,880 A | 6/1986 | Smith et al. | |
| 5,198,283 A | 3/1993 | Hausler et al. | |
| 5,599,598 A | 2/1997 | Valyi | |
| 6,428,732 B1* | 8/2002 | Onoue | B29C 33/12 257/E21.504 |

(Continued)

FOREIGN PATENT DOCUMENTS

JP    2009012185 A    1/2009

*Primary Examiner* — Christina A Johnson
*Assistant Examiner* — Xue H Liu
(74) *Attorney, Agent, or Firm* — Norton Rose Fulbright US LLP

(57) ABSTRACT

A thermoforming in-lay technique is discussed that uses retractable pins to hold an in-lay piece securely in place in a primary mold. The in-lay piece is fabricated prior to the primary molding process and creates multiple pin receivers in the in-lay that are retractably engaged by the retractable pins when placed into the primary mold. When the primary substrate is formed into the primary mold, the retractable pins prevent the in-lay piece from moving out of position. Once the primary substrate has cooled sufficiently, the pins are retracted allowing the finished primary carrier art to be removed from the primary mold.

8 Claims, 11 Drawing Sheets

(56) References Cited

U.S. PATENT DOCUMENTS

2010/0237544 A1* 9/2010 Niebling ............ B29C 47/0021
264/510
2012/0104775 A1 5/2012 Marur et al.

* cited by examiner

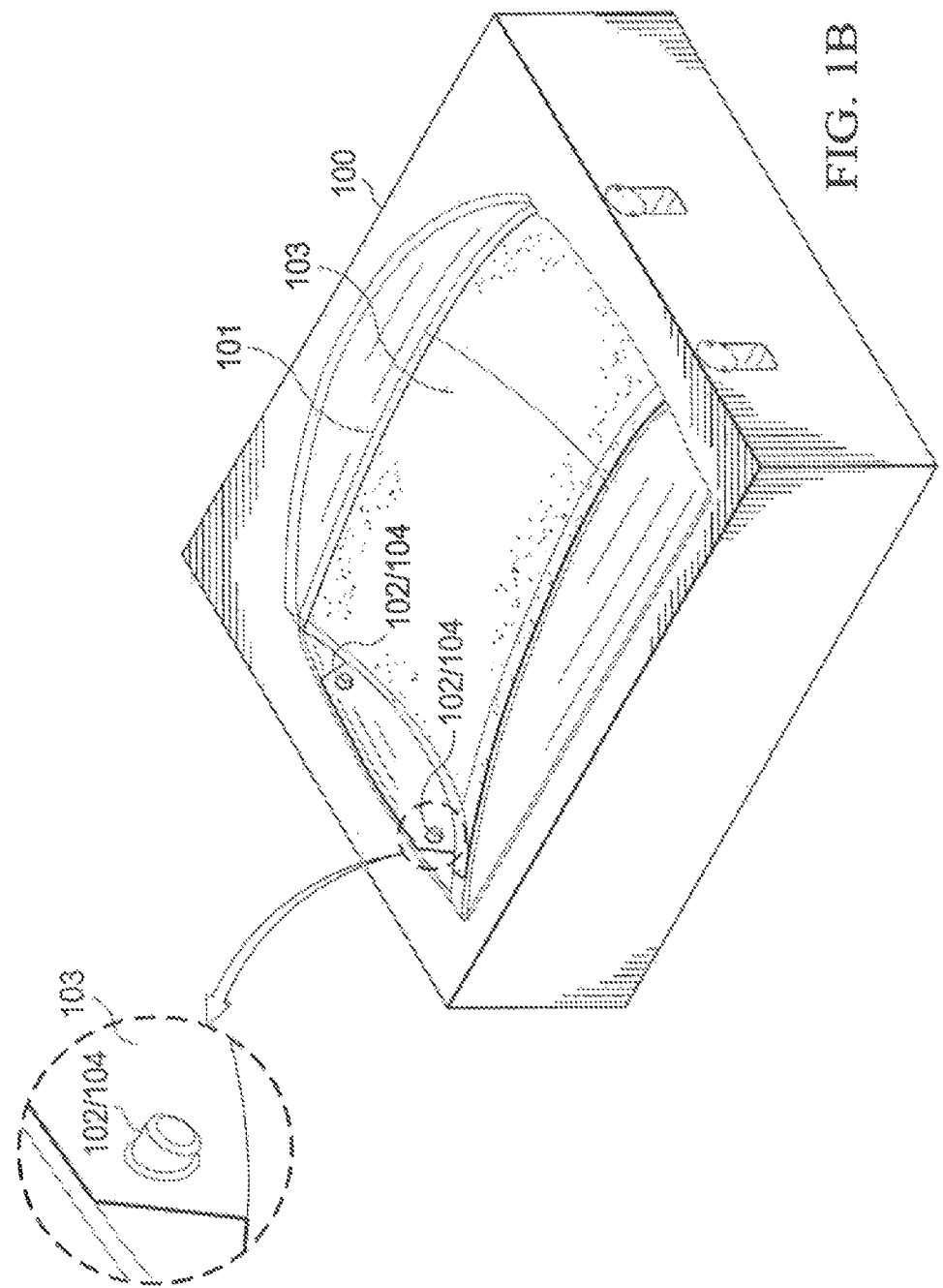

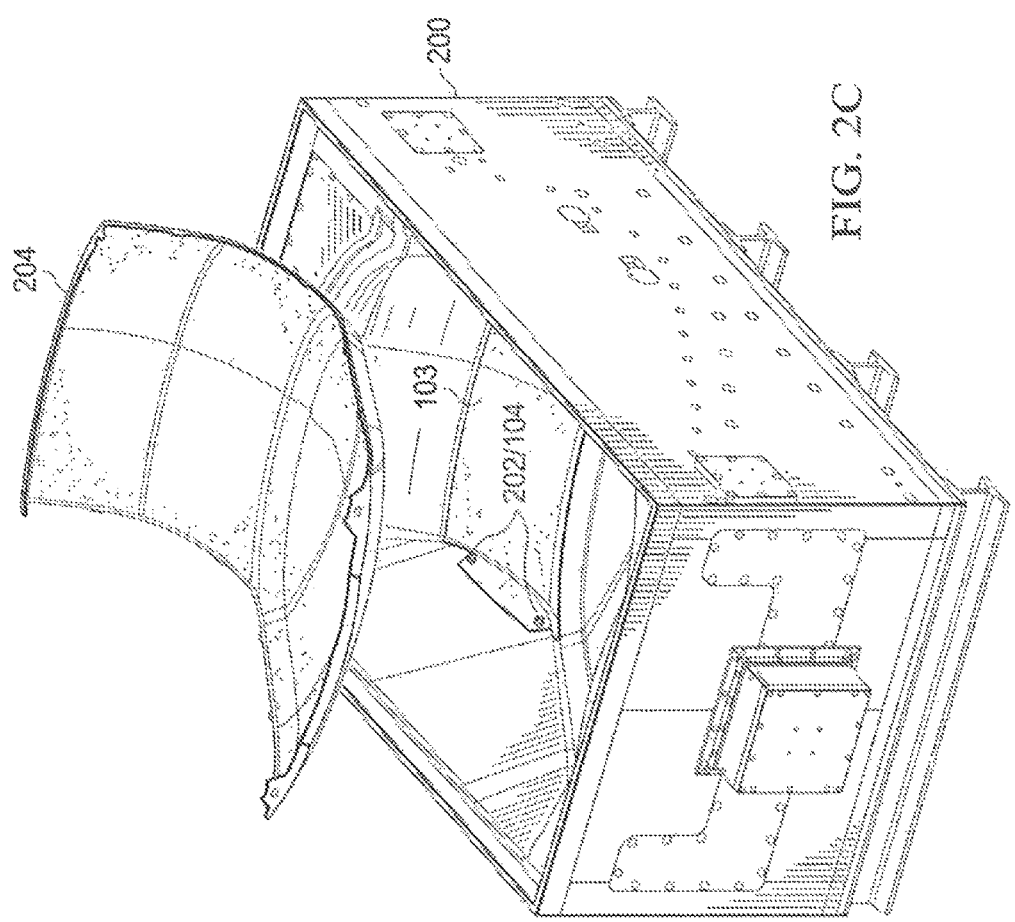

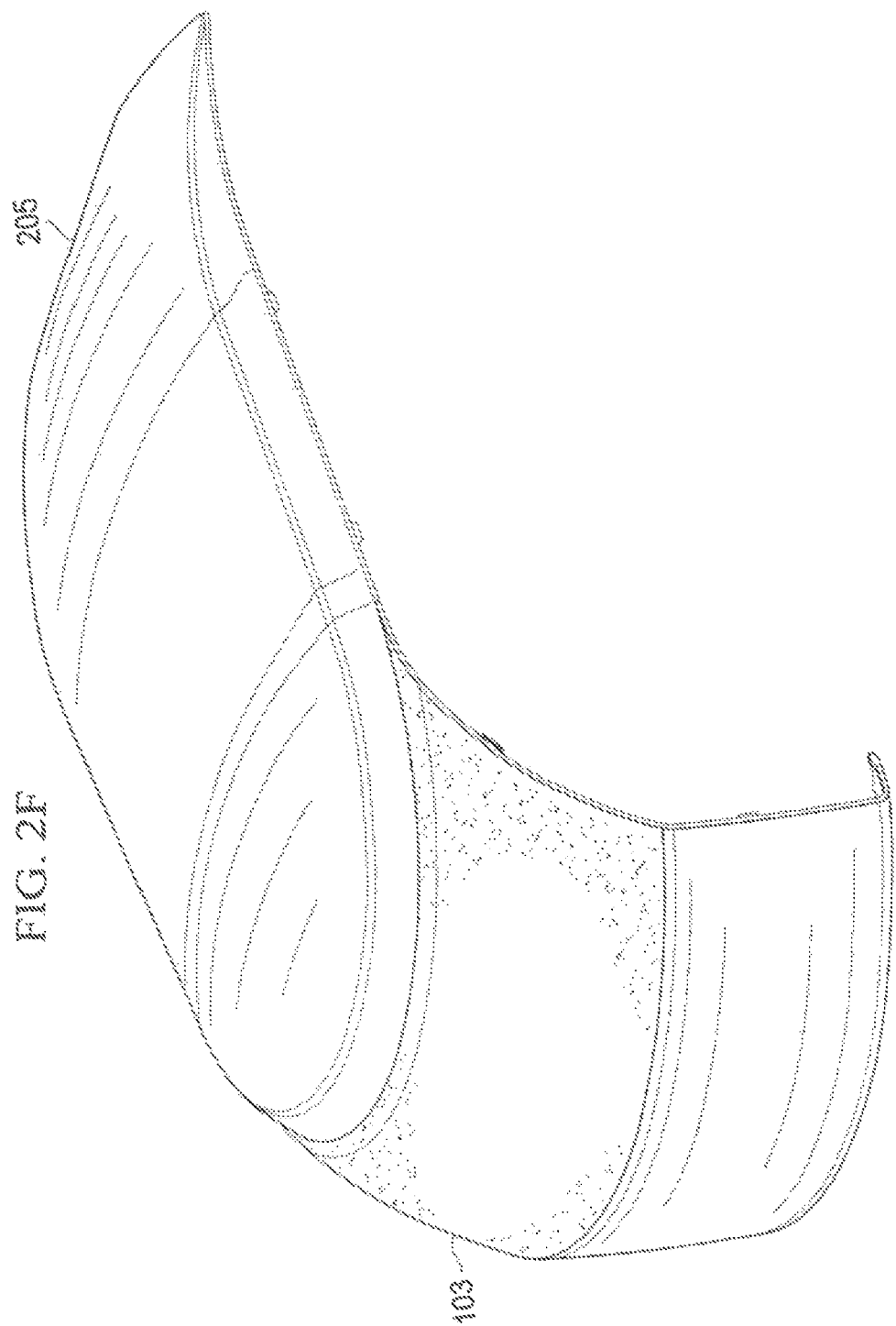

THERMOFORMING WITH PRECISION IN-LAY

CROSS-REFERENCE TO RELATED APPLICATIONS

The present application is a divisional of co-pending, commonly assigned, U.S. patent applications Ser. No. 13/418,108 entitled "THERMOFORMING WITH PRECISION IN-LAY," filed Mar. 12, 2012, the disclosure of which is hereby incorporated herein by reference:

BACKGROUND

Field

Aspects of the present disclosure relate generally to thermoform manufacturing, and more particularly, to thermoforming with precision in-lay.

Background

Thermoforming is a manufacturing process that uses thermoplastic flat sheets or film to create molded 3 dimensional. plastic items. The sheet or film is usually heated to its forming temperature by using various heating mechanisms, such as infrared, natural gas, or the like. The heated plastic is then stretched over or into a mold. The mold may often be temperature-controlled and may provide only single-surface. The plastic is held against the mold surface unit until cooled. Various methods for holding the plastic are commonly used, such as by using a vacuum (vacuum molding), or a combination of a vacuum and compressed air (pressure molding). Once the plastic has cooled sufficiently, the formed part is removed from the mold and may then be trimmed from the sheet, which may then be reground, mixed with virgin plastic, and reprocessed into another usable sheet.

In various thermoform-manufactured products, decorative applications may be made to the formed part. Traditionally, such cosmetic additions have been made through screen printing or painting. In screen printing, an application of colored ink is made over the formed plastic component to produce the desired design, whether for cosmetic, decorative, or identification purposes. Alternatively, a direct spray of paint may also be applied directly to the formed product in order to produce these visual results.

While screen printing or painting produce good results in transforming the plain, molded part into a commercial unit, because of the surface coating nature of these applications, the applied designs will generally wear off as the part is cleaned or handled or impacted. The rate of wear will depend on the particular solvents used for cleaning or the degree to which the item is impacted or abraded. Therefore, the appearance of the part may become unsatisfactory before the end of the useful life of the product.

One solution that has been used to address excessive wear in screen printed or painted formed parts is in-laying. The in-laying process replaces the ink or paint with a thin film of plastic that is embedded directly into the plastic substrate outer surface of the object during the thermoforming process. Various colors and design of such plastic film embedded into the underlying plastic of the formed part create favorable cosmetic, decorative, or identification results. Moreover, because the design is made from embedded plastic film, the design will generally be impervious to the typical wear and tear associated with screen printing or painting.

SUMMARY

Representative embodiments of the present disclosure are directed to a thermoforming in-lay technique that uses retractable pins to hold an in-lay piece securely in place in a primary mold. The in-lay piece is fabricated prior to the primary molding process and creates multiple pin receivers in the in-lay that are retractably engaged by the retractable pins when placed into the primary mold. When the primary substrate is formed into the primary mold, the engaged retractable pins prevent the in-lay piece from moving out of position. Once the primary substrate has cooled sufficiently, the pins are retracted allowing the finished primary carrier art to be removed from the primary mold.

In one aspect of the disclosure, a method of thermoforming includes placing an in-lay piece into a primary mold, where the in-lay piece has multiple pin receivers that are retractably engaged by multiple retractable pins in the primary mold. The method further includes forming a heated substrate into the primary mold, wherein the heated substrate forms around all exposed edges of the in-lay piece, cooling the heated substrate, retracting the retractable pins, and then removing a primary carrier part from the primary mold, where the primary carrier part comprises the in-lay piece molded into the heated substrate.

In an additional aspect of the disclosure, a thermoforming in-lay piece made up of a positive image portion representing a visible portion in a primary carrier part and a positioning portion having multiple pin receivers formed therein, where the pin receivers are configured to be retractably engaged by multiple retractable pins built into a primary mold.

In an additional aspect of the disclosure, a primary mold for thermoforming is made up of an in-lay pattern negative-image configured to receive an in-lay piece and multiple retractable pins configured to retractably engage multiple pin receivers formed in the in-lay piece placed in the primary mold.

In an additional aspect of the disclosure, a computer program product for in-lay processing includes a computer-readable medium having program code recorded thereon. The program code includes code to cause placement of an in-lay piece into a primary mold, where the in-lay piece having a plurality of pin receivers retractably engaged by a plurality of retractable pins in the primary mold. It also includes code to cause formation of a heated substrate into the primary mold, wherein the heated substrate forms around all exposed edges of the in-lay piece, code to cause cooling of the heated substrate, code to cause retraction of the plurality of retractable pins, and code to cause removal of a primary carrier part from the primary mold, the primary carrier part comprising the in-lay piece molded into the heated substrate.

In an additional aspect of the disclosure, an apparatus configured for in-lay forming. The apparatus includes at least one processor and a memory coupled to the processor. The processor is configured to cause placement of an in-lay piece into a primary mold, the in-lay piece having a plurality of pin receivers retractably engaged by a plurality of retractable pins in the primary mold. The processor is also configured to cause formation of a heated substrate into the primary mold, wherein the heated substrate forms around all exposed edges of the in-lay piece, to cause cooling of the heated substrate, to cause the plurality of retractable pins to retract, and to cause removal of a primary carrier part from the primary mold, the primary carrier part comprising the in-lay piece molded into the heated substrate.

BRIEF DESCRIPTION OF THE DRAWINGS

FIGS. 1A-1C are diagrams in a sequence illustrating an in-lay mold configured according to one aspect of the present disclosure.

FIGS. 2A-2F are diagrams in a sequence illustrating a primary mold configured according to one aspect of the present disclosure.

DETAILED DESCRIPTION

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

While the in-lay process addresses the wear problems associated with screen printing and painting of formed parts, there are challenges to in-laying that arise with securely placing the in-lay piece into the primary carrier part (e.g., the final molded piece, intermediate molded piece, etc.). Because the primary carrier part is formed in a similar fashion to the in-lay part, using a heated thermoplastic substrate and a placing force supplied by compressed air, a vacuum, or a combination of the two. The compressed air and/or vacuum force may cause the in-lay piece to move from its desired position creating a faulty molded product. With exact positioning a requirement for a quality finished product, inexact positioning may lead to excessive breakage costs to the product manufacturer.

In order to overcome this problem, the various embodiments of the present disclosure provide for extrusion receivers to be molded into the in-lay piece that match retractable extrusions (e.g., pins, ribs, buttons, or the like) engineered into the mold for the primary carrier part. For purposes of this application extrusions will be referred to generically as pins, However, it should be understood that, as used herein, pins refers to any applicable extrusions.

Figure 1A:
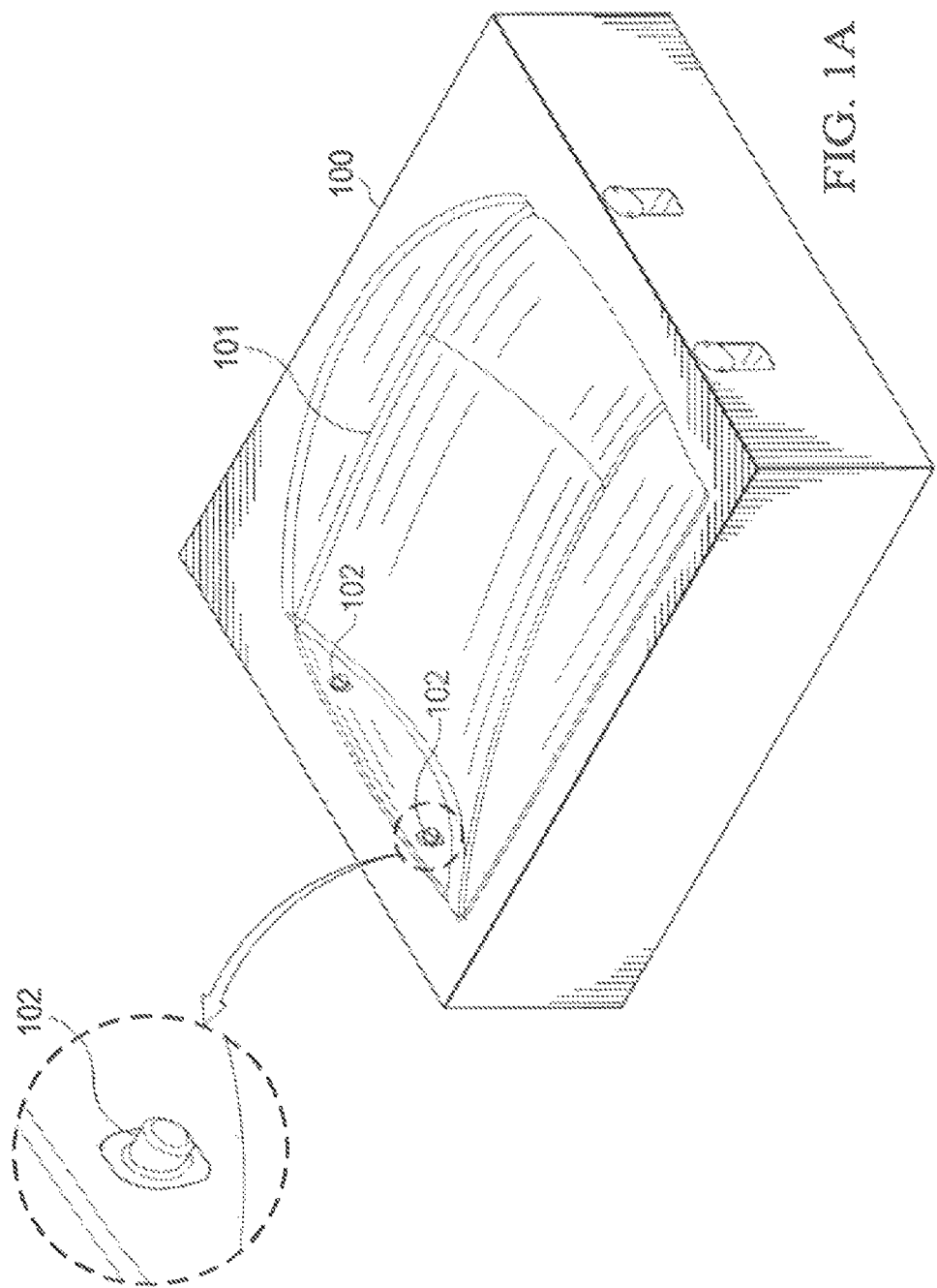
Figure 1C:
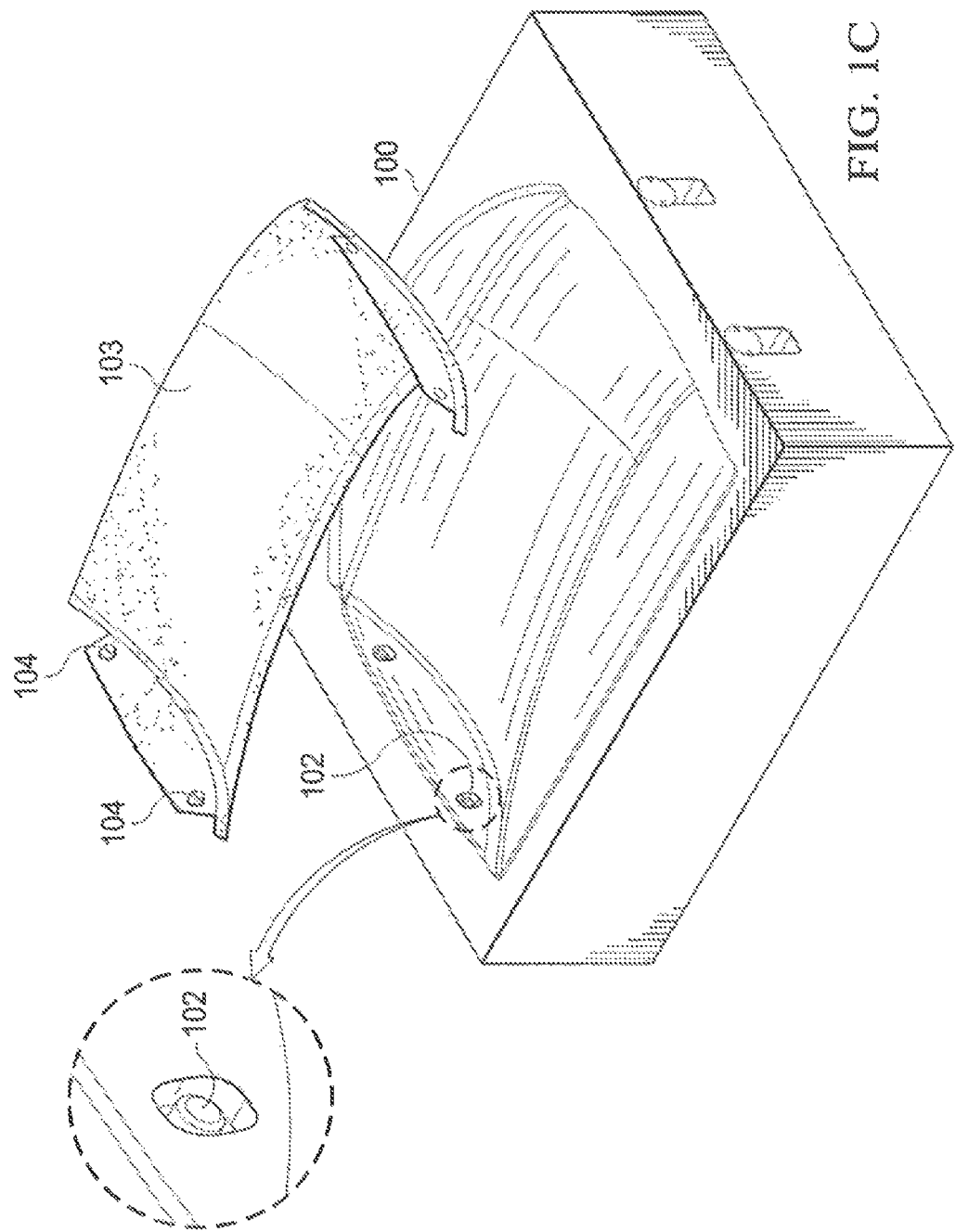

FIGS. 1A-1C are diagrams in a sequence illustrating in-lay mold 100 configured according to one aspect of the present disclosure. In-lay mold 100 may be created using various materials depending on the material used for the in-lay piece, the desired texture of the final product, or the like. For example, in-lay mold 100 may be made from aluminum, metal, or the like. As illustrated in FIG. 1A, in-lay mold 100 is made from a piece of block aluminum that has been milled to precise specifications using a computer numerical controlled (CNC) milling machine. In-lay mold 100 includes pattern negative-image 101 that provides the negative-image or female pattern into which the material is placed to form the in-lay piece. In-lay mold 100 also includes pins 102. Pins 102 operate to create a pin receiver in the final in-lay piece.

Turning now to FIG. 1B, a heated molding material, such as a thermoplastic, is placed into in-lay mold 100 and forms in-lay piece 103, seated in pattern negative-image 101. In-lay piece 103 includes pin receivers 104 formed directly over pins 102. In one example employing a thermoplastic molding material, a sheet of thermoplastic is heated to a formable temperature (e.g., 300 degrees F., 400 degrees F., and the like, depending on the type of thermoplastic being used). The thermoplastic sheet may be heated using various heating mechanisms, such as gas-flame heating, electric heating, ceramic infrared heating, and the like. In-lay mold 100 may also be heated to a lower temperature that allows the thermoplastic material to cool to a point where it may still be pliable but holds the positive shape of pattern negative-image 101.

Turning now to FIG. 1B, a heated molding material, such as a thermoplastic, is placed into in-lay mold 100 and forms in-lay piece 103, seated in pattern negative-image 101. In-lay piece 103 includes pin receivers 104 formed directly over pins 102. In one example employing a thermoplastic molding material, a sheet of thermoplastic is heated to a formable temperature (e.g., 300 degrees F., 400 degrees F., and the like, depending on the type of thermoplastic being used). The thermoplastic sheet may be heated using various heating mechanisms, such as gas-flame heating, electric heating, ceramic infrared heating, and the like. In-lay mold 100 may also be heated to a lower temperature that allows the thermoplastic material to cool to a point where it may still be pliable but holds the positive shape of pattern negative-image 101.

FIG. 2A-2F are diagrams in a sequence illustrating primary mold 200 configured according to one aspect of the present disclosure. Primary mold 200 includes in-lay pattern negative-image 201 which provides a negative image for receiving an in-lay piece to be molded into the final primary carrier part. The in-lay piece would be secured using retractable pins 202 located in a position that securely holds the in-lay piece in the correct position, i.e., in-lay pattern negative-image 201. Primary mold 200 also includes primary pattern negative-image 203 that provides the negative-image or female pattern into which the molding material or substrate is placed to form the primary carrier part. As with in-lay mold 100, primary mold 200 is a piece of CNC-milled aluminum.

Figure 2A:
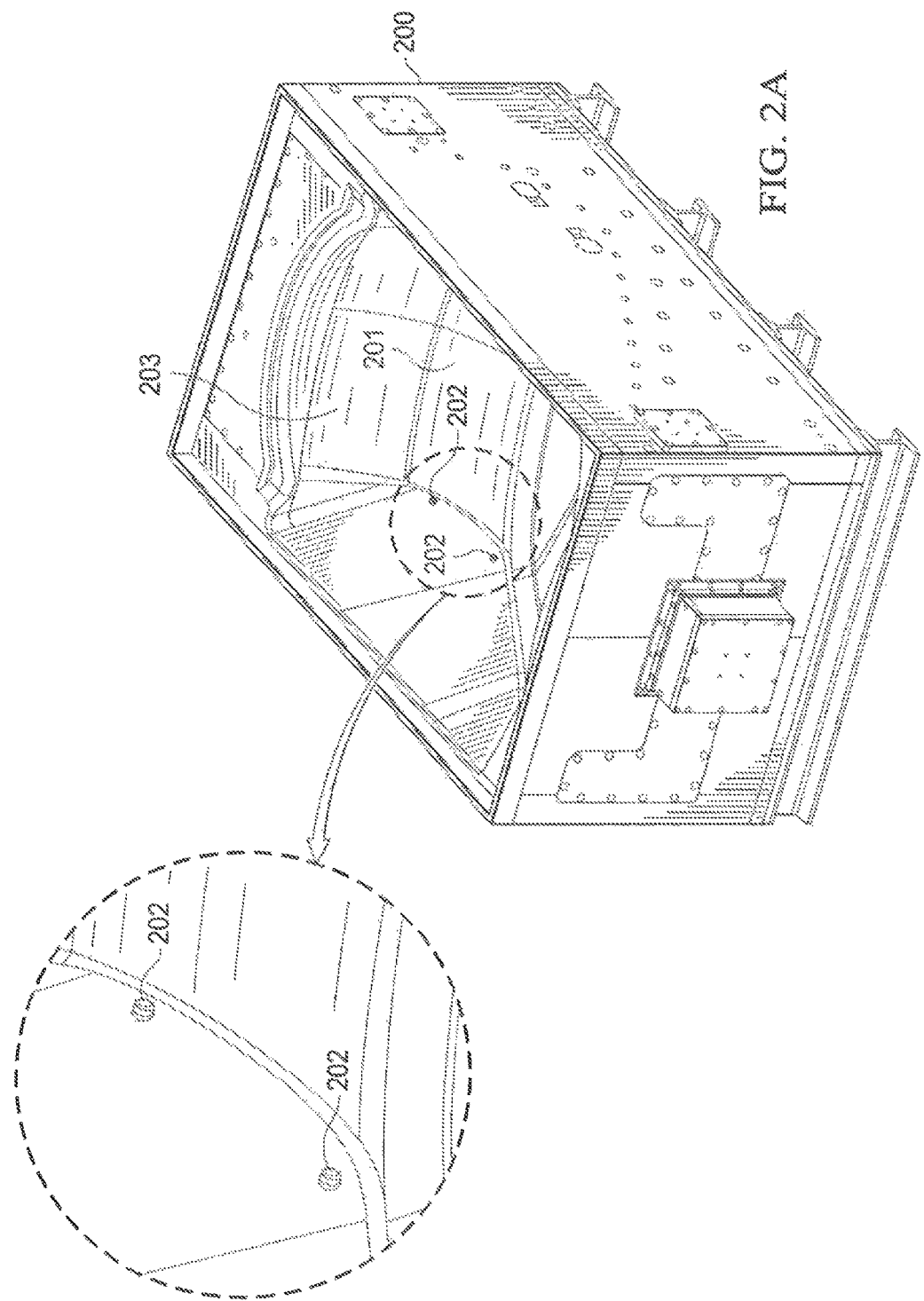
Figure 2B:
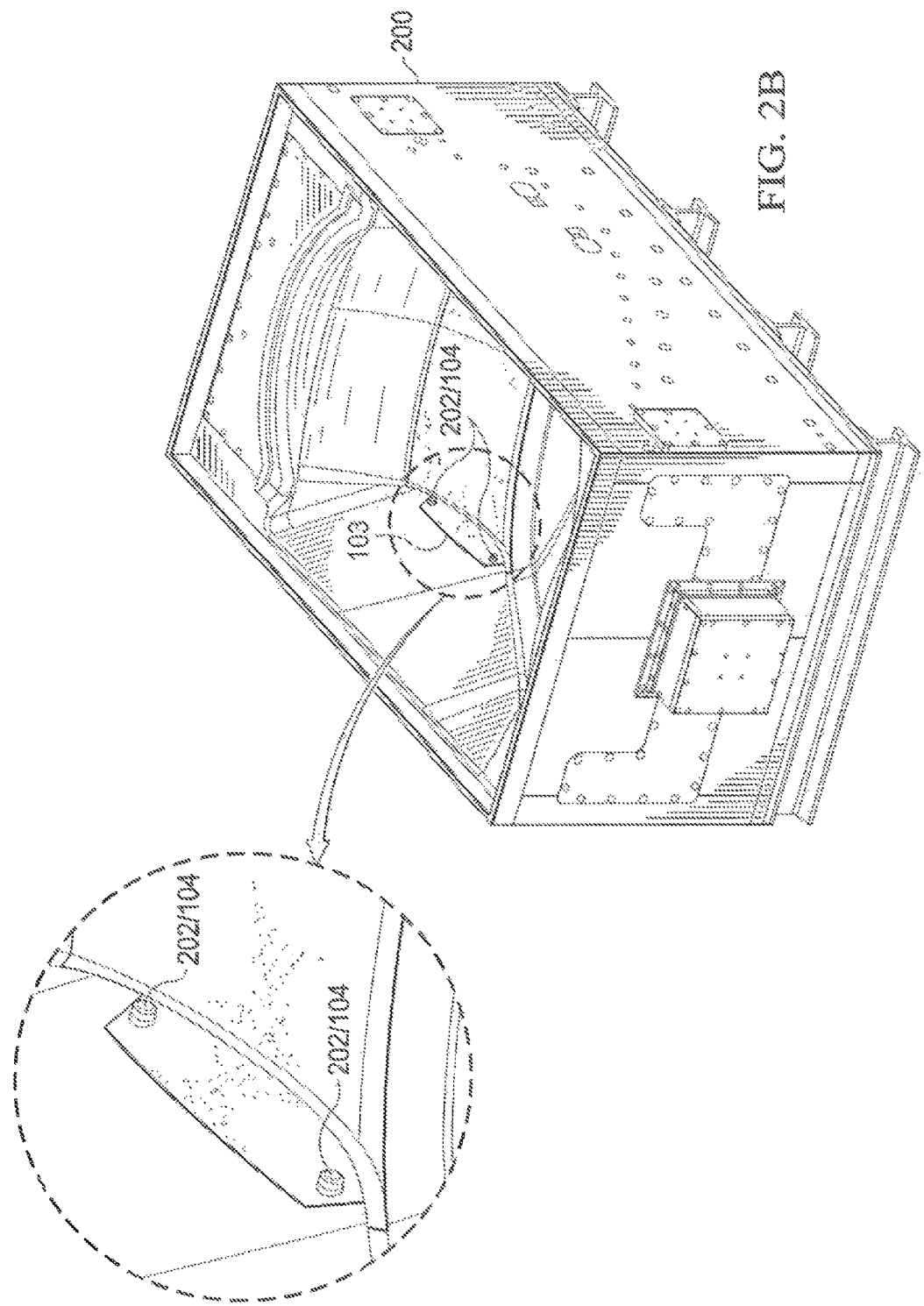
Figure 2D:
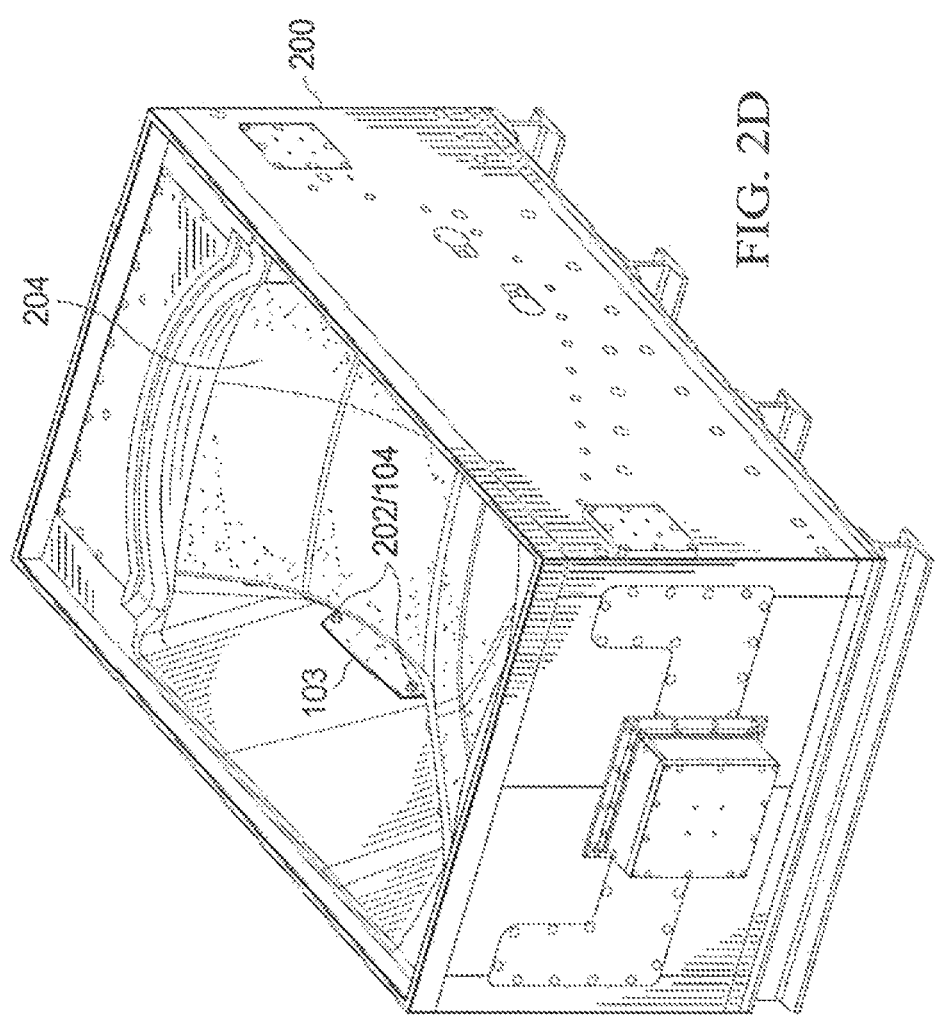

Turning now to FIG. 2B, in-lay piece 103 is placed into primary pattern negative-image 203 of primary mold 200 secured by retractable pins 202 being received into pin receivers 104. Primary substrate 204, as shown in FIG. 2C, is heated to the molding temperature. Applying air pressure to primary substrate 204, it is settled into primary pattern negative-image 203 of primary mold 200. The applied air pressure positions primary substrate 204 on to in-lay piece 103, as illustrated in FIG. 2D, Because in-lay piece 103 is secured with retractable pins 202, the air pressure will not dislodge it from in-lay pattern negative-image 201.

In selected embodiments, in some instances, in which holes have been drilled into in-lay piece 103, the holes allow the compressed air to escape that would have been trapped between in-lay piece 103 and primary substrate 204.

Figure 2E:
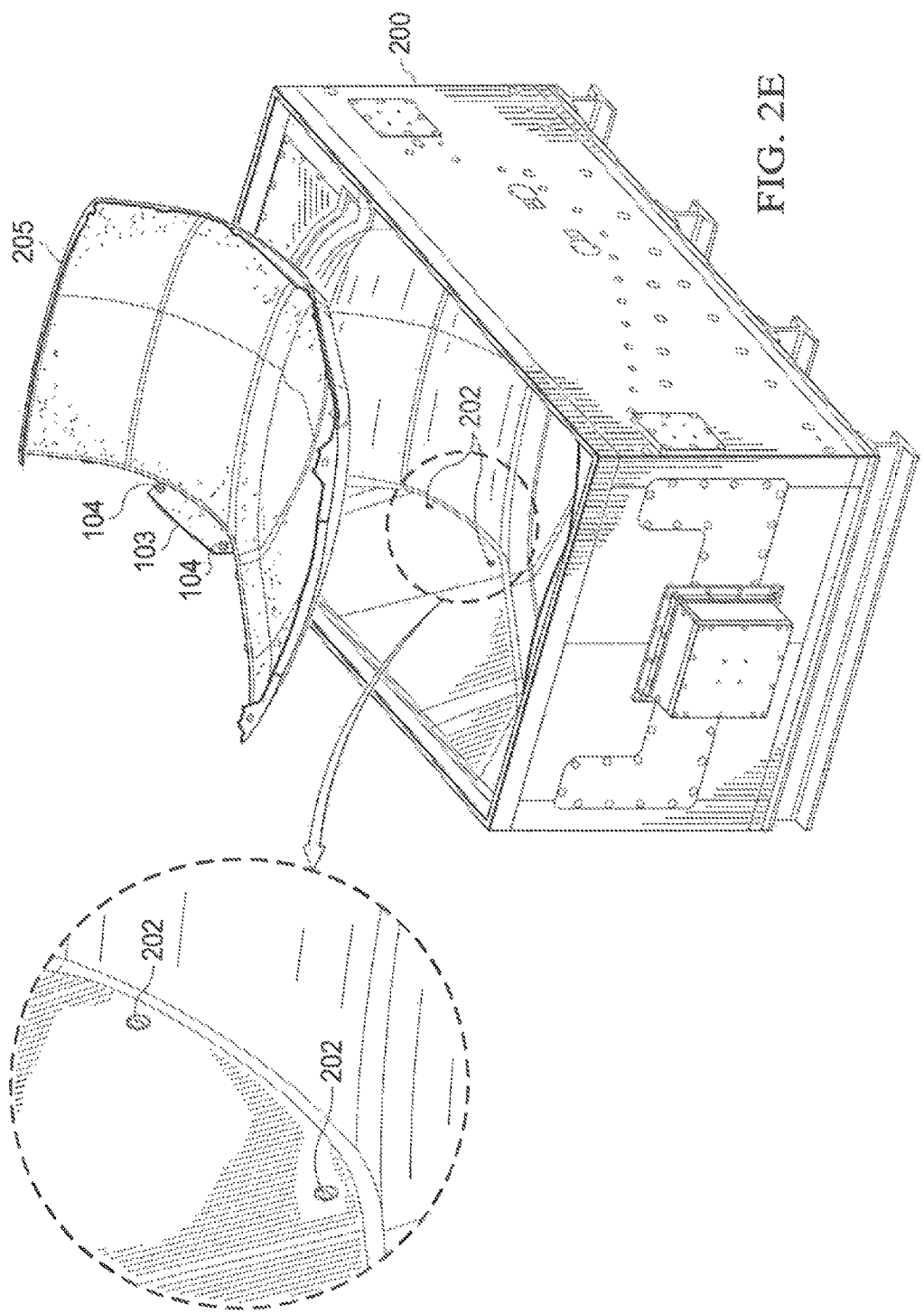

When primary substrate 204 is positioned on top of in-lay piece 103, it is heated to the desired molding temperature. At this temperature, primary substrate 204 will flash heat in-lay piece 103, allowing it form precisely against in-lay pattern negative-image 201 of primary mold 200. By forming precisely against in-lay pattern negative-image 201, in-lay piece 103 will pick up any texture or design provided on in-lay pattern negative-image 201. The air pressure will also force primary substrate 204 to completely encapsulate in-lay piece 103 on all exposed edges not in contact with primary mold 200. FIG. 2E illustrates primary carrier part 205 being removed from primary mold 200. In order to remove primary carrier part 205, retractable pins 202 are retracted into mold 200, thus, releasing primary carrier part 205 from primary mold 200. Primary carrier part 205 is the final monolithic part comprising in-lay piece 103 completely incorporated into the cooled primary substrate 204. Primary carrier part 205 also includes the portion of in-lay piece 103 where pin receivers 104 are located.

After removing primary carrier part 205 from primary mold 200, the part of in-lay piece 103 where pin receivers 104 are located is removed from primary carrier part 205. Additionally, the excess flashing and any other substrate has leaked outside of the desired shape is removed. Moreover, any finish processing may then be applied to primary carrier part 205. FIG. 2F illustrates the final clean version of primary carrier part 205 as it has been prepared for application.

It should be noted that in various embodiments of the present disclosure, pattern negative image 101 of in-lay mold 100 and primary pattern negative-image 203 of primary mold 200 are created slightly larger than the size of the resulting part. The difference in size accounts for the shrinkage in the substrate material that occurs as it cools.

Figure 3A:
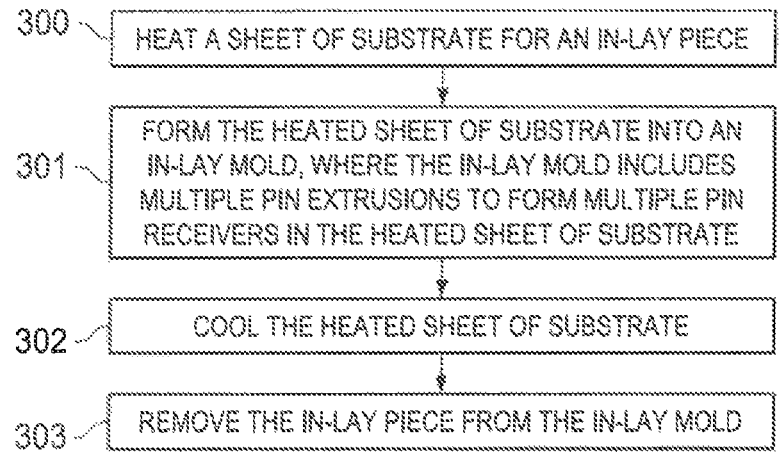
FIGS. 3A-3B are functional block diagrams illustrating example blocks executed to implement one aspect of the present disclosure.

FIG. 3A is a functional block diagram illustrating example blocks executed to implement one embodiment of the present disclosure. Prior to creating the primary carrier part, the in-lay parts are created to have multiple pin receivers in a positioning portion of the in-lay. The positioning portion may be fabricated only for positioning purposes, such that, when the final primary carrier part is completed, the position portion will be trimmed away. In block 300, a sheet of substrate for the in-lay piece is heated to forming temperature. The heated substrate is then formed in an in-lay mold, in block 301, that includes multiple pin extrusions. The pin extrusions operate to create multiple pin receivers in the in-lay piece.

Once the substrate has been formed into the in-lay mold, it is allowed to cool, in block 302, after which the final in-lay piece is removed from the in-lay mold in block 303. The final in-lay piece includes the multiple pin receivers that will be used in the primary thermoforming process. The final in-lay piece may then be finished by trimming all of the excess flashing that extends beyond the desired edges of the in-lay piece.

Figure 3B:
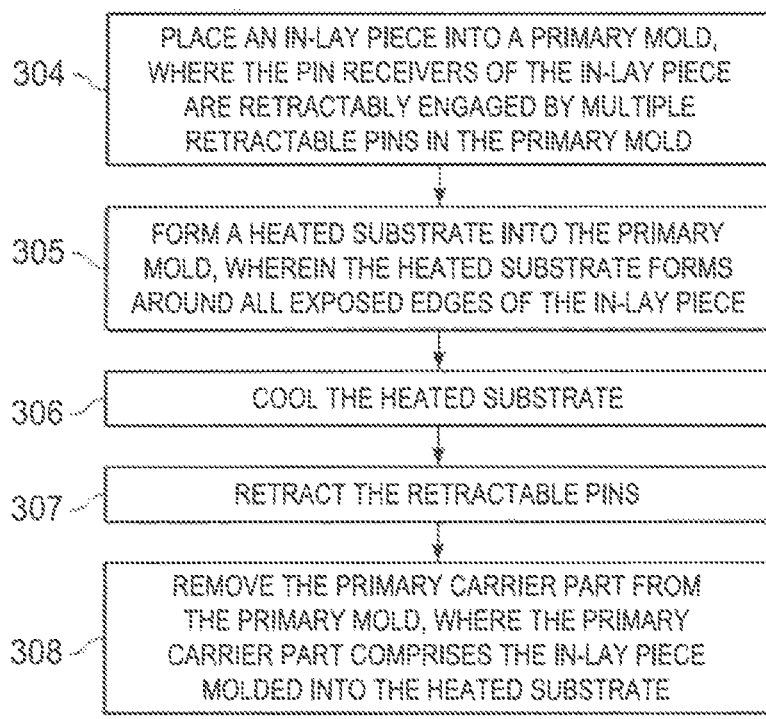

FIG. 3B is a functional block diagram illustrating example blocks executed to implement one embodiment of the present disclosure. After the in-lay pieces have been fabricated, the primary carrier part may be formed using a primary mold. In block 304, the an in-lay piece is placed into the primary mold, in which the pin receivers of the in-lay piece are retractably engaged by the retractable pins of the primary mold. The primary carrier part will be fabricated from another section of substrate material. In block 305, the heated substrate is formed into the primary mold. Various means may be available to form the heated substrate into the primary mold. After being heated to the appropriate forming temperature, a vacuum force, minimum of 50 PSI compressed air, and combination of the two forces may be used to draw the heated substrate into the primary mold, the forming force causes the heated substrate to form around all of the exposed edges of the in-lay piece. The retractable pins of the primary mold prevent the in-lay piece from being moved out of position by the forming force used to form the heated substrate into the primary mold. The heat from the heated substrate may then flash heat the substrate material of the in-lay piece to pick up any design or texture present on the primary mold in contact with the in-lay pieces.

In block 306, the heated substrate is allowed to cool, after which the retractable pins in the primary mold are retracted in block 307. Without the retractable pins being engaged with the pin receivers of the in-lay piece, the entire primary carrier part may be removed from the primary mold in block 308. This final part may then be finished by trimming the area in which the pin receivers are located as well as any excess flashing that may be extended beyond the desired part edge.

Figure 4:
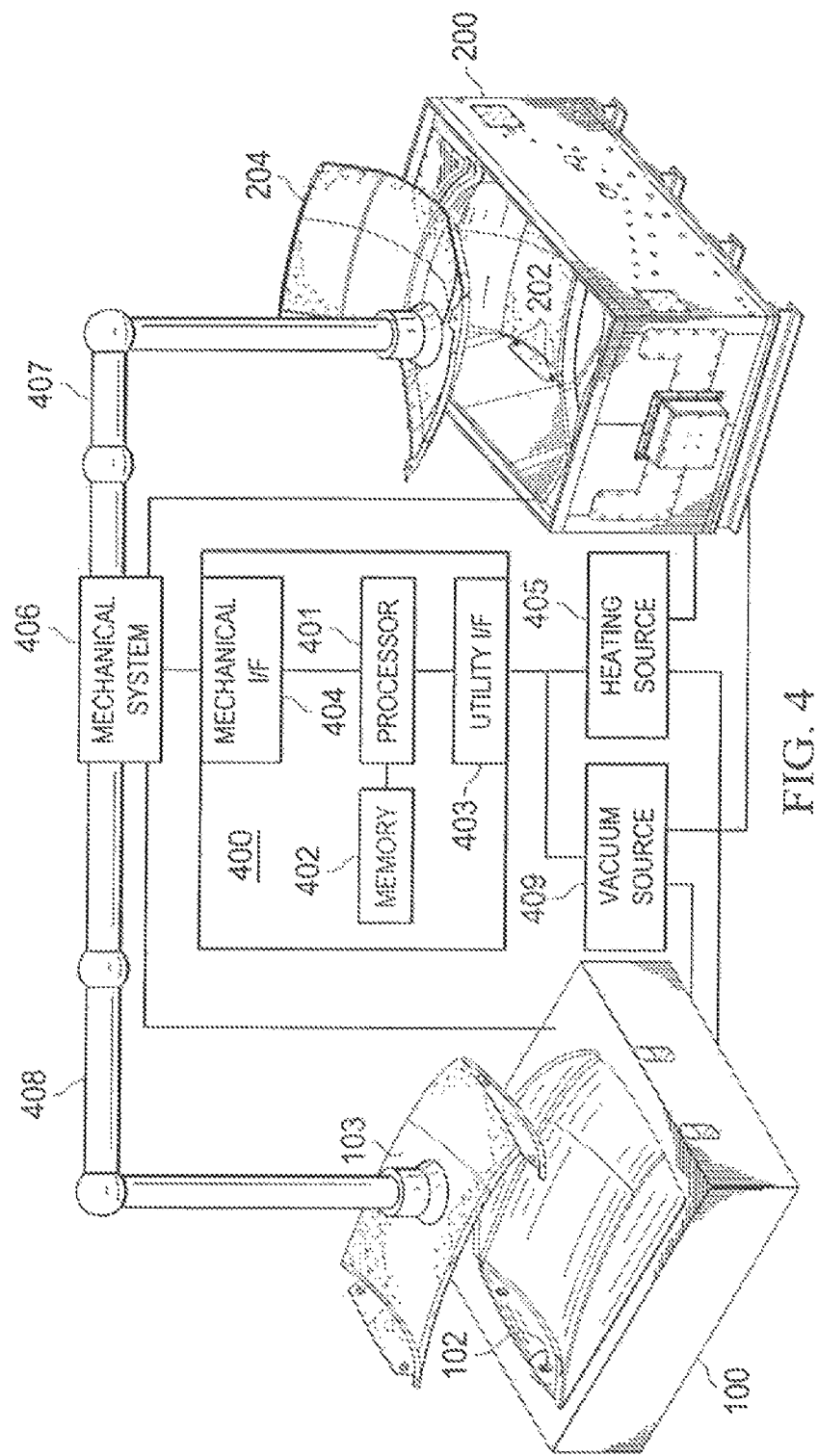
FIG. 4 is a block diagram illustrating computer controller 400 configured according to one aspect of the present disclosure.

FIG. 4 is a block diagram illustrating computer controller 400 configured according to one aspect of the present disclosure. In automating the in-lay process described according to the various embodiments, computer controller 400 is configured to control the in-lay process. The functional blocks as described in FIGS. 3A and 3B are stored as program code in memory 402. When executed by processor 401, the executed program code provides instructions to mechanical system 406, heating source 405, and the like for implementing the in-lay process. For example, when executing the computer code to form in-lay piece 103, processor 401 sends instructions to utility interface 403 and mechanical interface 404. The instructions delivered to utility interface 403, among other things, controls heating source 405 and vacuum source 409. The instructions delivered to mechanical interface 404, among other things, controls mechanical system 406, which may include various mechanical functions of the processing, including intra-process transportation. For instance, under control of signals received from computer controller 400, mechanical system 406 manipulates conveyor arm 408 to place an unfinished piece of substrate into in-lay mold 100. Signals received by heating source 405 cause heat to be applied to in-lay mold 100. Additional signals received from computer controller 400 by vacuum source 409 cause vacuum pressure to be applied to in-lay mold 100 which engages the heating, raw substrate into in-lay mold 100. Mechanical system 406, again based on signals received from computer controller 400, engages pins 102 which will eventually form pin receivers 104 (FIG. 1C).

When the forming process is completed, program code from memory 402 executed by processor 401 causes additional signals to be transmitted through utility interface 403 and mechanical interface 404. Signals received by heating source 405 stops heat from being applied to in-lay mold 100, which begins cooling in-lay piece 103. Signals received by vacuum source 409 stops the vacuum pressure from being applied to in-lay mold 100. Signals received by mechanical system 406 manipulates conveyor arm 408 to pick in-lay piece 103 from out of in-lay mold 100. Conveyor arm 408 may be implemented using various compatible methods, for example, using vacuum pressure to grasp in-lay piece 103, using electrostatic attraction, or the like. Additional signals received by mechanical system 406 from computer controller 400 cause conveyor arm 408 to deliver in-lay piece 103 to the next locations for further processing.

Under control of signals received from computer controller 400, mechanical system 406 causes in-lay piece 103 to be placed into primary mold 200, Additional substrate material is then placed over in-lay piece 103 into primary mold 200 by conveyor arm 407. Signals sent by processor 401 through mechanical interface 404 to mechanical system 406 cause retractable pins 202 to engage pin receivers 104 (FIG. 1C) in in-lay piece 103 holding in-lay piece 103 firmly in place. Signals sent by processor 401 through utility interface 403 to heating source 405 and vacuum source 409 cause heat, minimum of 50 PSI compressed air and vacuum pressure to be applied to primary mold 200. This heat and pressure causes primary substrate 204 to conform into primary mold 200. When the forming process has finished, computer controller 400 sends signals to heating source 405 and vacuum source 409 to stop applying heat, compressed air and vacuum pressure to primary mold 200. Signals sent by processor 401 through mechanical interface 404 to mechanical system 406 cause retractable pins 202 to retract from pin receivers 104 (FIG. 1C). Computer controller 400 then signals mechanical system 406 to remove cooled primary substrate 204 from primary mold 200 using conveyor arm 407. With retractable pins 202 retracted and little or no vacuum pressure being applied, conveyor arm 407 is able to remove cooled primary substrate from mold 200 and place it in the appropriate location for further processing and finishing.

For a firmware and/or software implementation, the methodologies may be implemented with modules (e.g., procedures, functions, and so on) that perform the functions described herein, Any machine-readable medium tangibly embodying instructions may be used in implementing the methodologies described herein. For example, software code may be stored in a memory and executed by a processor unit. Memory may be implemented within the processor unit or external to the processor unit. As used herein the term "memory" refers to any type of long term, short term, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes non-transitory computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A primary mold for thermoforming, the primary mold comprising:
    an in-lay pattern negative-image configured to receive an in-lay piece; and
    a plurality of retractable pins configured to retractably engage a plurality of pin receivers formed in a positioning portion of the in-lay piece placed in the primary mold during formation of a heated substrate, wherein the primary mold is configured to form the heated substrate around at least all exposed edges not in the positioning portion of the in-lay piece not in contact with the primary mold.

2. The primary mold of claim 1 further comprising:
    a primary pattern negative-image configured to receive heated substrate to thermoform a primary carrier piece, the primary pattern negative-image positioning the heated substrate over the in-lay piece.

3. A non-transitory computer-readable medium having program code recorded thereon, the program code comprising:
    program code executable by a computer for causing the computer to place an in-lay piece into a primary mold, the in-lay piece having a plurality of pin receivers retractably engaged by a plurality of retractable pins in the primary mold;
    program code executable by the computer for causing the computer to form a heated substrate into the primary mold, wherein the heated substrate forms around at least all exposed edges not in a positioning portion of the in-lay piece not in contact with the primary mold, wherein the plurality of retractable pins are being received into the plurality of pin receivers on the in-lay piece placed within the primary mold cavity during formation of the heated substrate into the primary mold;
    program code executable by the computer for causing the computer to cool the heated substrate;
    program code executable by the computer for causing the computer to retract the plurality of retractable pins; and
    program code executable by the computer for causing the computer to remove a primary carrier part from the primary mold, the primary carrier part comprising the in-lay piece molded into the heated substrate.

4. The non-transitory computer-readable medium of claim 3 further comprising:
    program code executable by the computer for causing the computer to trim the plurality of pin receivers and excess flashing from the primary carrier part.

5. The non-transitory computer-readable medium of claim 3 further comprising:
    program code executable by the computer for causing the computer to form the in-lay piece, wherein the program code executable by the computer for causing the computer to form the in-lay piece comprises:
        program code executable by the computer for causing the computer to heat a sheet of substrate;
        program code executable by the computer for causing the computer to form the heated sheet of substrate into an in-lay mold, the in-lay mold including a plurality of pin-extrusions for forming the plurality of pin receivers in the heated sheet of substrate;
        program code executable by the computer for causing the computer to cool the heated sheet of substrate; and
        program code executable by the computer for causing the computer to remove the in-lay piece from the in-lay mold.

6. An apparatus configured for in-lay forming, said apparatus comprising:
    at least one processor; and
    a memory coupled to said at least one processor,
    wherein said at least one processor is configured:
        to cause placement of an in-lay piece into a primary mold, the in-lay piece having a plurality of pin receivers retractably engaged by a plurality of retractable pins in the primary mold;
        to cause formation of a heated substrate into the primary mold, wherein the heated substrate forms around at least all exposed edges not in a positioning portion of the in-lay piece not in contact with the primary mold, wherein the plurality of retractable pins are being received into the plurality of pin receivers on the in-lay piece placed within the primary mold cavity during the formation;

to cause cooling of the heated substrate;

to cause the plurality of retractable pins to retract; and to cause removal of a primary carrier part from the primary mold, the primary carrier part comprising the in-lay piece molded into the heated substrate.

7. The apparatus of claim 6 wherein the at least one processor is further configured to cause trimming of the plurality of pin receivers and excess flashing from the primary carrier part.

8. The apparatus of claim 6 wherein the at least one processor is further configured:

to cause formation of the in-lay piece, wherein the configuration of the at least one processor to cause formation of the in-lay piece comprises configuration:

to cause heating of a sheet of substrate;

to cause formation of the heated sheet of substrate into an in-lay mold, the in-lay mold including a plurality of pin-extrusions for forming the plurality of pin receivers in the heated sheet of substrate;

to cause cooling of the heated sheet of substrate; and to cause removal the in-lay piece from the in-lay mold.

* * * * *